(12) United States Patent
Hurst et al.

(10) Patent No.: US 11,708,823 B1
(45) Date of Patent: Jul. 25, 2023

(54) PLUNGER ACTUATED VALVE

(71) Applicant: HALLIBURTON ENERGY SERVICES, INC., Houston, TX (US)

(72) Inventors: Justin Lee Hurst, Healdton, OK (US); James A. Olis, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/751,951

(22) Filed: May 24, 2022

(51) Int. Cl.
| | |
|---|---|
| F04B 7/00 | (2006.01) |
| F16K 31/44 | (2006.01) |
| F04B 53/12 | (2006.01) |
| F16K 1/44 | (2006.01) |

(52) U.S. Cl.
CPC ........... *F04B 7/0073* (2013.01); *F16K 1/443* (2013.01); *F16K 31/445* (2013.01); *F04B 53/127* (2013.01); *F16K 2200/204* (2021.08)

(58) Field of Classification Search
CPC ...... F04B 53/12; F04B 53/125; F04B 53/102; F04B 53/1022; F04B 53/1085; F04B 7/0073; F04B 43/127; F04B 53/1035; F04B 53/1025; F04B 53/127; F16K 31/445; F16K 2200/204
USPC ......................... 417/547, 552, 553
See application file for complete search history.

(56) References Cited

U.S. PATENT DOCUMENTS

| | | | | |
|---|---|---|---|---|
| 23,953 | A | * 5/1859 | Selser ..................... | F04B 53/12 417/548 |
| 377,054 | A | * 1/1888 | Vanduzen ............... | F04B 53/12 417/548 |
| 990,616 | A | * 4/1911 | Whitaker ................ | F04B 49/24 417/570 |
| 1,180,536 | A | * 4/1916 | Pownall .............. | F04B 39/0016 137/516.21 |
| 1,247,113 | A | * 11/1917 | Holmes ............... | F04B 39/0016 417/548 |
| 1,938,218 | A | * 12/1933 | Dempsey, Jr. ...... | F04B 39/0016 417/570 |
| 8,590,614 | B2 | 11/2013 | Surjaatmadja et al. | |
| 2020/0277951 | A1 | 9/2020 | Hunter et al. | |

* cited by examiner

*Primary Examiner* — Bryan M Lettman
(74) *Attorney, Agent, or Firm* — Polsinelli PC

(57) ABSTRACT

A plunger actuated valve system is provided. The plunger actuated valve system includes a discharge valve, a stem extending from the discharge valve, and a suction valve coupled with the stem. The suction valve can be operable to abut against a plunger as the plunger translates in a first direction such that the suction valve is in a closed configuration. The suction valve includes a latching component operable to abut against a catch surface of the plunger when the plunger translates in a second direction opposite of the first direction such that the suction valve translates in the second direction.

20 Claims, 8 Drawing Sheets

PLUNGER ACTUATED VALVE

FIELD

The present disclosure relates generally to pumping systems. In particular, the present disclosure relates to the valve configurations for proppant pumping systems.

BACKGROUND

In order to produce oil or gas, a well is usually drilled into a pocket of oil reservoir. Cracks are then form by pumping at a high pressure a mix fluid to create small fractures within the oil reservoir. This allows for the extraction of oil, natural gas, geothermal energy, and others. The mix fluid generally includes proppants, chemicals, and water. Proppants serve to prop the fractures open once the mix fluid is removed. Otherwise, the fracture openings will close, thus, decreasing the productivity of the well. Because proppant must withstand the force of the fractures trying to close, it is typically highly crush resistant.

Pumps are used to pump the mix fluid. When pumping the fluid, the fluid flows through an entry valve into a recess which includes a plunger. The entry valve then closes, the plunger compresses the fluid, and the fluid flows through an exit valve under pressure. Entry valves and exit valves may have a resistive force to keep the valves close and prevent the flow of fluid through the valves.

BRIEF DESCRIPTION OF THE DRAWINGS

Implementations of the present technology will now be described, by way of example only, with reference to the attached figures, wherein.

DETAILED DESCRIPTION

Figure 1:
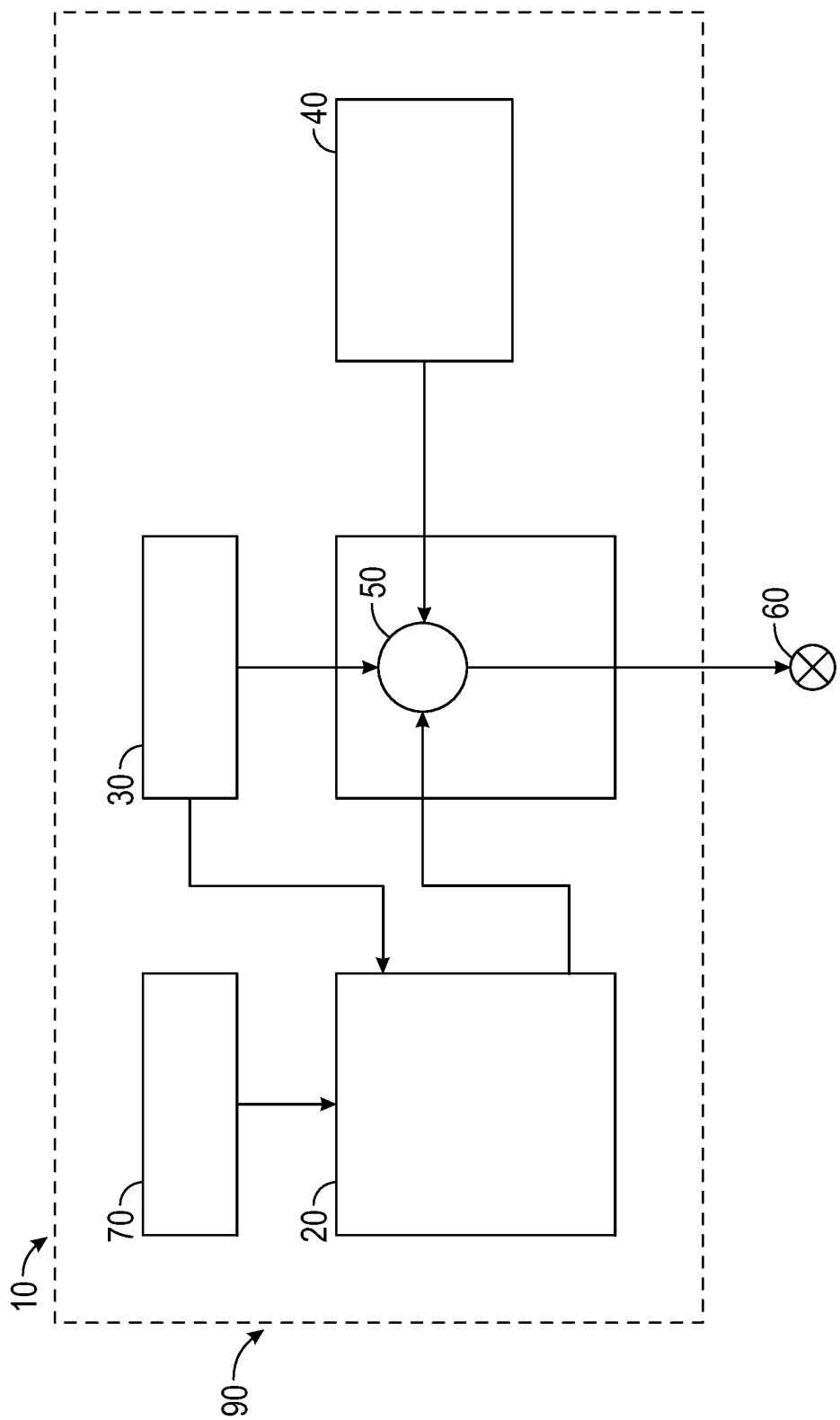
FIG. 1 is a diagram illustrating an example of a fracturing system that may be used in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected.

Disclosed herein is a pumping system including a suction valve, discharge valve, and plunger disposed within a pump. The plunger, the suction valve, and the discharge valve together move fluid and/or proppants within the pump and discharged the fluid and/or proppants from the pump. The suction valve controls flow of the fluid from the plunger annulus to a first chamber. The discharge valve controls flow of the fluid from the first chamber to the second chamber and out of the pump. The plunger can be driven by a power end or any other suitable power source, so long as the power end is operable to cause the plunger to translate. The plunger can translate in a first direction and a second direction opposite of the first direction.

The discharge valve can be operable to control fluids from exiting the pump. When the discharge valve abuts the receptor and/or the cap, the discharge valve is in an open configuration. In the open configuration, fluids and proppant can flow through the discharge valve and be expelled from the pump. When the discharge valve abuts the discharge valve bias, the discharge valve is in a close configuration. Proppants and fluids will not be able to flow through the discharge valve in the close configuration. The discharge valve can include a second stem protruding from the discharge valve. In at least one example, the second stem is operable to extend from the discharge valve through the first chamber and into the plunger annulus. The suction valve can be operable to couple the discharge valve via the second stem. The suction valve can include a seal and packing set that can be frictionally coupled to the second stem.

The suction valve can include a latching component which is coupled to the suction valve. The latching component, by being radially positioned on top and around the stem, assists in coupling the suction valve to the plunger. Further, the configuration of the key additionally helps preserve the orientation and angle of both the discharge valve and suction valve to maintain a centered position or prevent both the discharge valve and suction valve from loading on one side which can cause the pump to fail. By maintaining a centered position within the pump, the suction valve will be prevented from loading on one side which can cause the pump to fail. By maintaining the positioning of the suction valve, the suction valve can wear down evenly, extending the life of the suction valve. The suction valve would then need to be replaced less often, saving on time, effort, and cost.

When the plunger translates in the first direction, the discharge valve transitions to an open configuration. During the translation in the first direction, the plunger abuts against the suction valve such that the suction valve also translates in the first direction with the plunger. The suction valve transitions to a closed configuration to prevent fluid from flowing between the first chamber and the plunger annulus. The discharge valve transitions to an open configuration when the plunger translates to the first direction. At the open configuration of the discharge valve, the discharge valve can be at its maximum opening distance allowing fluids to flow unimpeded into the second chamber from the first chamber. When the plunger translates in the second direction, the discharge valve transitions to a closed configuration to prevent fluid from flowing between the second chamber and the first chamber, and the suction valve transitions to an open configuration permitting fluid to flow between the plunger and annulus and the first chamber. At the open configuration of the suction valve, the suction valve can be at its maximum opening distance allowing fluids to flow unimpeded into the first chamber from the plunger annulus.

The maximum opening distance can be the greatest amount that the discharge valve or suction valve can open. The maximum opening distance allows fluids to flow unobstructed against either valves and with minimized resistance from the valves trying to close. Benefits this configuration can provide include reducing premature erosion of both valves. In conventional pumps, the discharge valve may open in intermediate amounts such that the maximum opening distance is not achieved. Accordingly, the proppants may constantly strike the conventional valves and/or get stuck and clog up the discharge valve. In at least one example, a resistance force (not displayed) can urge the valves toward a close configuration. Ultimately, the premature erosion of the discharge valve can reduce the lifespan of the pump. Accordingly, the presently disclosed pump is configured such that the discharge valve always opens to the maximum opening distance so that the fluid and/or proppant does not damage and/or clog the discharge valve.

Figure 2:
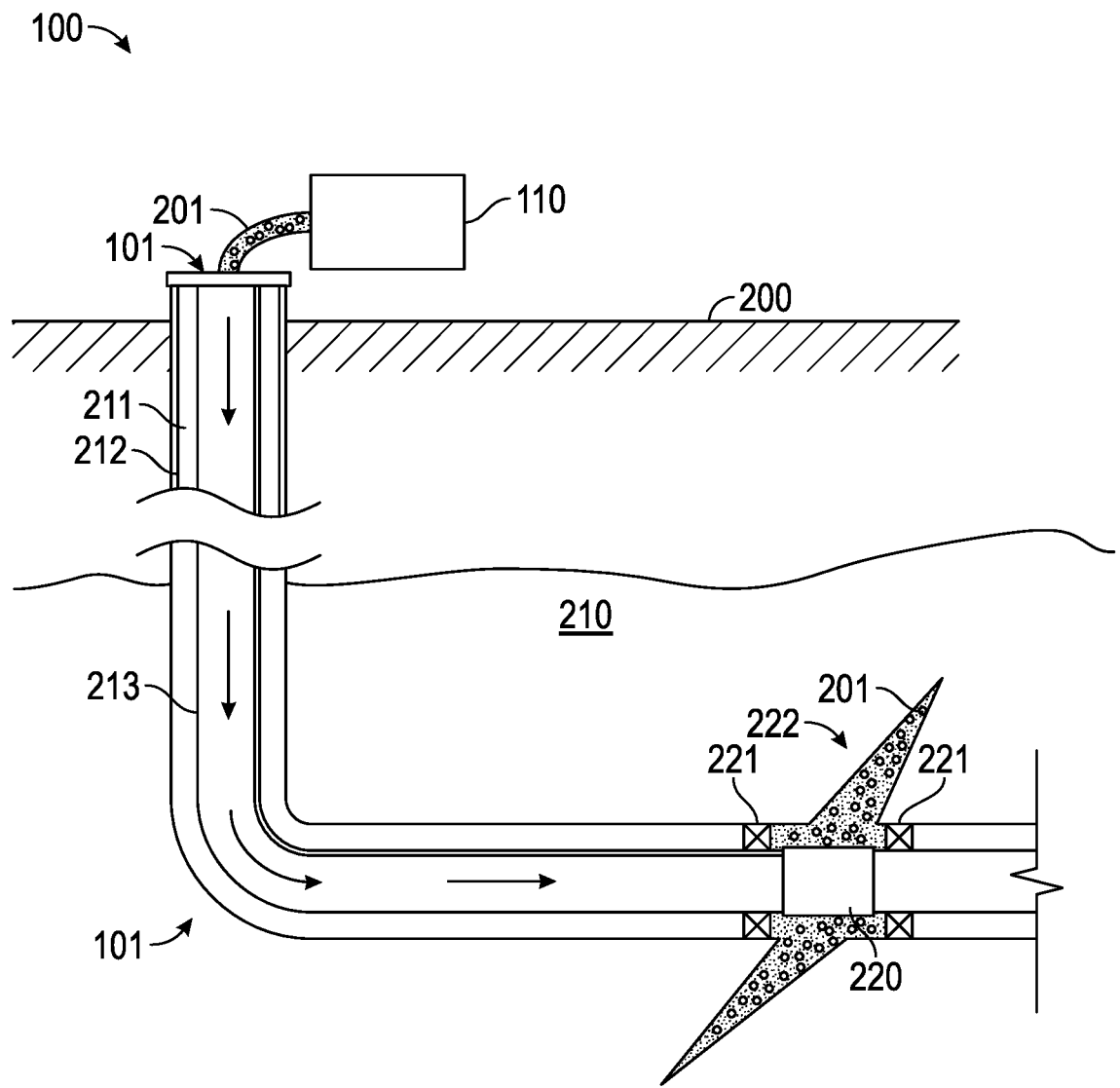
FIG. 2 is a diagram illustrating an example of an environment in which a fracturing operation may be performed.

An exemplary fracturing system is illustrated in FIGS. 1-2. In this example, the system 100 includes a pumping system 110 which is fluidly coupled with a well 101. The pumping system 110 includes a fracturing fluid producing apparatus 111, a fluid source 112, a proppant source 113, and a pump and blender system 114 and resides at the surface at a well site where the well 101 is located. In certain instances, the fracturing fluid producing apparatus 111 combines a gel pre-cursor with fluid (e.g., liquid or substantially liquid) from fluid source 112, to produce a hydrated fracturing fluid that is used in fracturing the formation, for example, by being pumped through a conveyance 213 and a multi-acting downhole tool 220 (see FIG. 2) when in the open configuration. The hydrated fracturing fluid can be a fluid for ready use in a fracture stimulation treatment of the well 101 or a concentrate to which additional fluid is added prior to use in a fracture stimulation of the well 101. In at least one example, the fracturing fluid may include water, a hydrocarbon fluid, a polymer gel, foam, air, wet gases and/or other fluids.

The proppant source 113 can include any suitable proppants that can be combined with the fracturing fluid. Proppants can include, for example, sand to keep a hydraulic fracture open, during or following a fracturing treatment. The system may also include additive source 115 that provides one or more additives to alter the properties of the fracturing fluid. The additives can be, for example, gelling agents, weighting agents, friction reducers, and/or cross-linkers. For example, additives 115 can be included to reduce pumping friction pressure, to reduce or eliminate the fluid's reaction to the geological formation in which the well is formed, to operate as surfactants, and/or to serve other functions. The additive source 115 is coupled with an additive pump which pumps the additives from the additive source 115 into the fracturing fluid producing apparatus 111.

The pump and blender system 114 receives the fracturing fluid and combines it with other components, including proppant from the proppant source 113 and/or additional components from the additives 115. The resulting mixture may be pumped down the well 101 and out through the multi-acting downhole tool 220 under a pressure sufficient to create or enhance one or more fractures in a subterranean zone, for example, to stimulate production of fluids from the zone. Notably, in certain instances, the fracturing fluid producing apparatus 111, fluid source 112, and/or proppant source 113 may be equipped with one or more metering devices (not shown) to control the flow of fluids, proppants, and/or other compositions to the pumping and blender system 114. Such metering devices may permit the pumping and blender system 114 to source from one, some or all of the different sources at a given time, and may facilitate the preparation of fracturing fluids using continuous mixing or "on-the-fly" methods. Thus, for example, the pumping and blender system 114 can distribute fracturing fluid and/or proppant through the multi-acting downhole tool 220 to the target subterranean zone.

FIG. 2 illustrates a well 101 performing a fracturing operation in a portion of a subterranean formation of interest 210 surrounding a wellbore 211. The wellbore 211 extends from the surface 200, and the fracturing fluid 201 is applied to a portion of the subterranean formation 210 surrounding the horizontal portion of the wellbore through, for example, the multi-acting downhole tool 220. The tool 220 can include ports, holes, or a sleeve which permits exit of fluid from the conveyance 213. It should be noted that while FIG. 2 generally depicts a land-based operation, those skilled in the art would readily recognize that the principles described herein are equally applicable to operations that employ floating or sea-based platforms and rigs, without departing from the scope of the disclosure. Also, even though FIG. 2 depicts a vertical wellbore, the present disclosure is equally well-suited for use in wellbores having other orientations, including horizontal wellbores, slanted wellbores, multilateral wellbores or the like. The wellbore 211 can include a casing 212 that is cemented or otherwise secured to the wellbore wall. The wellbore 211 can be uncased or include uncased sections. In cased wells, perforations can be formed using shape charges, a perforating gun, hydro-jetting and/or other tools.

The well 101 is shown with a conveyance 213 depending from the surface 200 into the wellbore 211. The conveyance 213 may include coiled tubing, jointed pipe, and/or other structures that allow fluid to flow into the wellbore 211. The conveyance 213 can include flow control devices that control the flow of fluid from the interior of the conveyance 213 into the subterranean zone 2. As illustrated in FIG. 2, the conveyance 213 and/or the wellbore 211 may include one or more sets of packers 221 that seal the annulus between the conveyance 213 and wellbore 211 to define an interval of the wellbore 221 into which the fracturing fluid 201 will be pumped. FIG. 2 shows two packers 221, one defining an uphole boundary of the interval and one defining the downhole end of the interval. When the fracturing fluid 201 is introduced into wellbore 211 at a sufficient hydraulic pressure, one or more fractures 222 may be created in the subterranean zone 210. The one or more components in the fracturing fluid 201 may enter the fractures 222 where they may remain after the fracturing fluid flows out of the wellbore. These proppant particulates may "prop" fractures 222 such that fluids may flow more freely through the fractures 222.

The pumping system 110, for example the pumping system 110 as illustrated in FIG. 1, is fluidly coupled to the conveyance 213 to pump the fracturing fluid 201 into the wellbore 211 through the conveyance 213.

Figure 3:
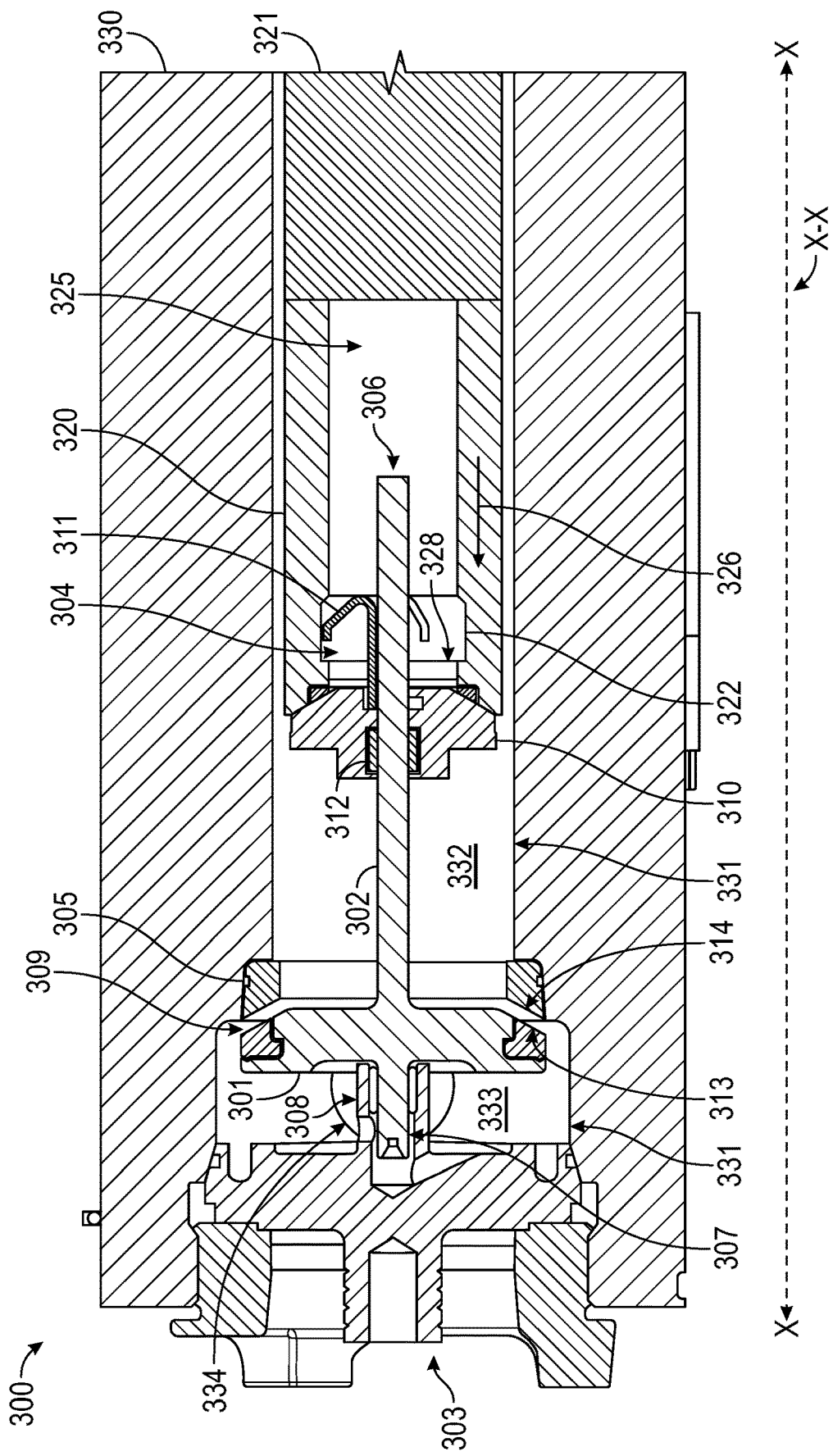
FIG. 3 is a partial cross-sectional view of a pump.

FIG. 3 is a partial cross-sectional view of a pump 300. In at least one example, as illustrated in FIG. 3, the pump 300 can have a horizontal orientation (e.g., substantially perpendicular to gravity direction). The pump 300 is operable to move fluid such that the fluid is moved to the desired location. The pump 300 can include a plunger 320, a discharge valve 301, and a suction valve 310. The plunger 320, discharge valve 301, and suction valve 310 together can move fluids within the pump 320 and discharged from the pump 320. The suction valve 310 controls flow of fluids into a first chamber 332. The discharge valve 301 can control the flow of fluids from the first chamber 332 into a second chamber 333 and discharged from the pump 320.

The plunger 320 can be disposed in a body 330 of the pump 300. The body 330 can form a body annulus 331 within the body 330. In at least one example, the body annulus 331 can span along a longitudinal axis X-X. The body annulus 331 can be configured such that the plunger 320 is disposed within the body annulus 331 of the body 330.

The plunger 320 can form a plunger annulus 325. The plunger annulus 325 can span at least a portion of the plunger 320 along the longitudinal axis X-X. Fluid can flow through the plunger annulus 325, for example as the plunger 325 translates. In at least one example, the plunger 320 and the plunger annulus 325 allows one or more fluids, such as fracturing fluid including proppant, to flow through the plunger 320.

Figure 4:
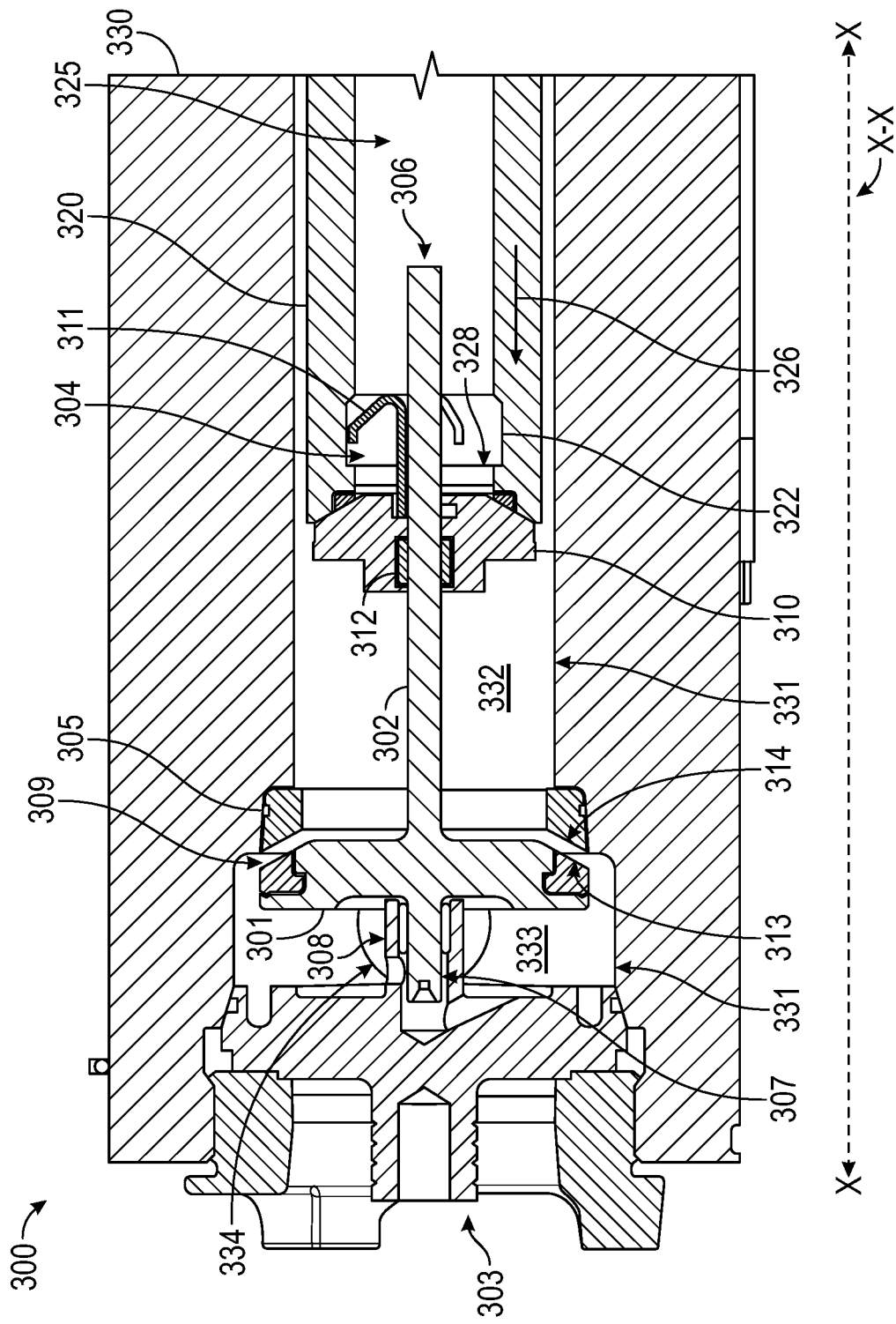
FIG. 4 is a partial cross-sectional view of a pump when a plunger translates in a first direction.
Figure 5:
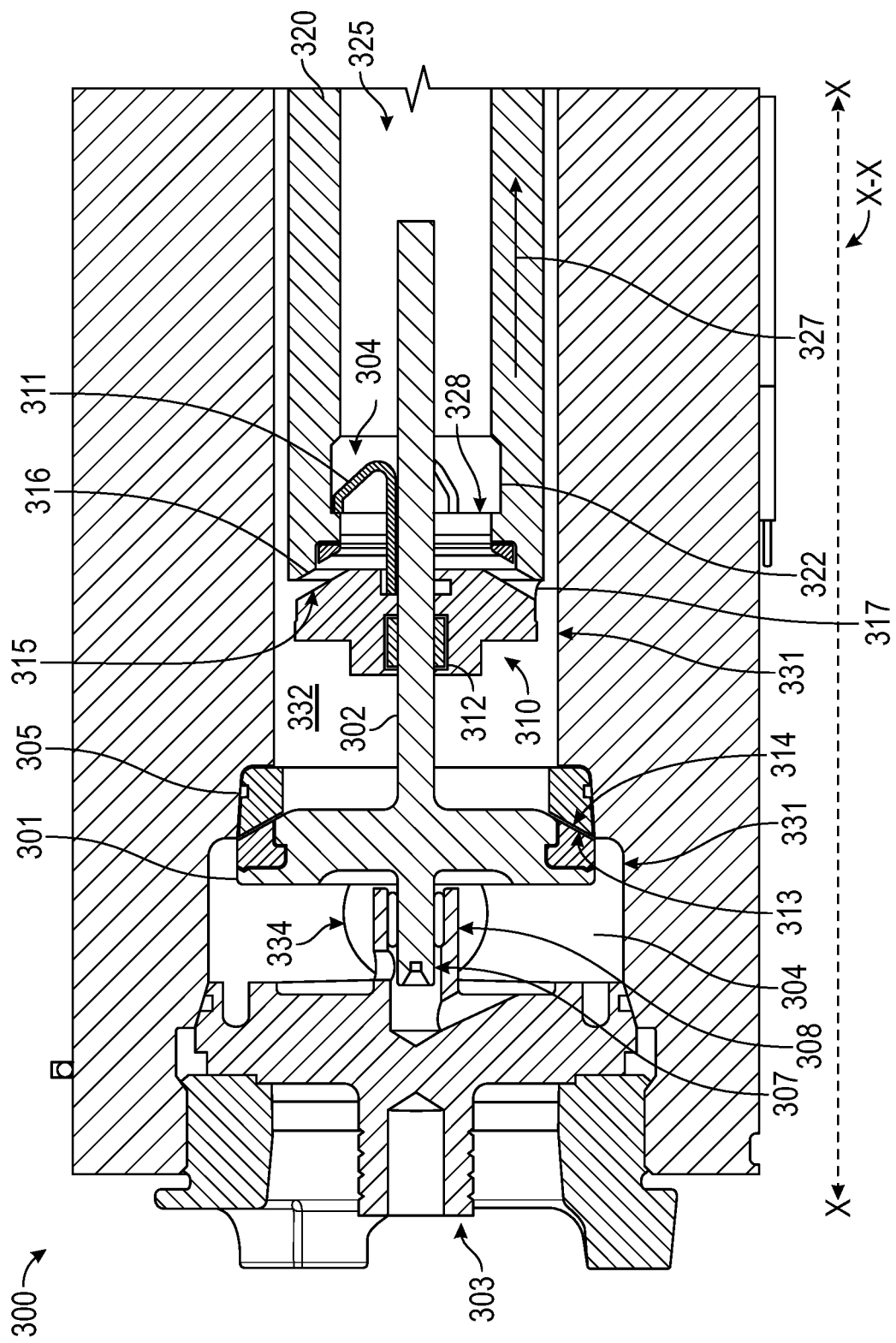
FIG. 5 is a partial cross-sectional view of a pump when the plunger translates in a second direction.

The plunger 320 can be operable to translate along the longitudinal axis X-X within the body annulus 331. The plunger 320 is operable to translate in a first direction 326 (as shown in FIG. 3 and FIG. 4) and a second direction 327 (as shown in FIG. 5), the second direction 327 being the opposite of the first direction 326. In at least one example, the first direction 326 can be a discharge stroke in which fluid is expelled from the pump 300, and the second direction 327 can be a suction stroke in which fluid is moved within the pump 300. The plunger 320 can translate in the first direction 326 towards a discharge valve 301 or away from the power end 321. The second direction 327 can be the plunger 320 translating away from the discharge valve 301 or towards the power end 321. It should be noted the first direction 326 and discharge stroke may be used interchangeably in the disclosure. It should also be noted the second direction 327 and suction stroke may be used interchangeably in the disclosure.

In at least one example, the plunger 320 can be coupled to and driven by a power end 321. The power end 321 is operable to move the plunger 320 so that the plunger 320 translates, for example along a longitudinal axis X-X within the body annulus 331. The power end 321 can include a motor or any other suitable power source without deviating from the scope of the disclosure, so long as the power end 321 is operable to cause the plunger 320 to translate. The power end 321 may include various components commonly employed in pumps that are not shown or discussed herein. For example, the power end 321 may include a rotatable crankshaft (not displayed) attached to at least one reciprocating element (e.g., a plunger or piston) by way of a crank arm (e.g., through a transmission and drive shaft) (not shown) and operable to actuate rotation thereof. In operation, rotation of the crankshaft induces translational movement of the crank arm/connecting rod (not shown), thereby causing the reciprocating element to extend and retract along a flow path.

The pump 300 can include a discharge valve 301. The discharge valve 301 can be operable to control fluids from exiting the pump 300. The entrance of the body annulus 331 of the pump 300 can include a cap 303 operable to couple to the discharge valve 301. In at least one example, the discharge valve 301 can include a first stem 307 protruding from the discharge valve 301 towards the cap 303. The cap 303, in some examples, can be coupled to the discharge valve 301 by a receptor 308 operable to receive the first stem 307. The cap 303 receiving the first stem 307 assists in maintaining the orientation and positioning of the discharge valve 301. As the pump 300 can be positioned horizontally such that the longitudinal axis X-X is substantially perpendicular to gravity direction, as illustrated in FIG. 3, conventional discharge valves may experience excessive wear and tear on only one side. The cap 303 can preserve the angle of orientation the discharge valve 301. By maintaining a substantially horizontal position of the first stem 307 so the discharge valve 301 maintains a centered position within the pump 300, the discharge valve 301 will be prevented from loading on one side which can cause the pump 300 to fail. By maintaining the positioning of the discharge valve 301 as in FIG. 3, the discharge valve 301 can wear down evenly, extending the life of the discharge valve 301. The discharge valve 301 would then need to be replaced less often, saving on time, effort, and cost.

In at least one example, the cap 303 can receive the discharge valve 301 to control the movement of the discharge valve 301 when the discharge valve 301 transitions between open and closed configurations. In at least one example, the receptor 308 can protrude from the cap 303 or have any suitable configuration operable to receive and allow the discharge valve 301 to translate longitudinally before abutting against the cap 303 either directly or indirectly. In at least one example, when the discharge valve 301 abuts the receptor 308 and/or the cap 303, the discharge valve is in an open configuration. In the open configuration, fluids and proppant can flow through the discharge valve 301 and be expelled from the pump 300.

In some examples, the receptor 308 can permit the first stem 307 to translate along the longitudinal axis X-X within the receptor 308 of the cap 303. In some examples, the receptor 308 of the cap 303 can be longer than the first stem 307 which prevents the discharge valve 301 from being decoupled from the cap 303 while defining a set range of horizontal translation the discharge valve 301 can move prior to abutting the receptor 308 or a discharge bias 305. The discharge bias 305, in some examples, can serve the purpose of abutting or stopping the discharge valve 301 when the discharge valve 301 is translating in the second direction 327.

In some examples, the discharge bias 305 can be located along the outer circumference of an entrance of a first chamber 332. The first chamber 332, in some examples, can be defined as a region between the discharge bias 305 and the suction valve 323. The discharge bias 301 can include a discharge bias portion 313. The discharge bias contact 313, in some examples, can include a region of surface area that can be operable to come into contact or abuts a discharge valve contact 314. The discharge valve contact 314, in some examples, can be a region of surface area that can be operable to come into contact or abuts the discharge bias contact 313 located on the discharge valve 301.

As illustrated in FIGS. 3 and 4, the discharge valve 301 is at its maximum opening distance 309. In at least one example, when the discharge valve 301 abuts the receptor 308 or the cap 303, the discharge valve 301 is at its maximum opening distance 309. The maximum opening distance 309 can be the greatest amount that the discharge valve 301 can open. The maximum opening distance 309 between the discharge valve 301 and the discharge bias 305 can allow fluids to flow into a second chamber 333 unobstructed against the discharge valve 301 and with minimized resistance from the discharge valve 301 trying to close.

Benefits this configuration can provide include reducing premature erosion of the discharge valve 301. In conventional pumps, the discharge valve 301 may open in intermediate amounts such that the maximum opening distance is not achieved. Accordingly, the proppants may constantly strike the conventional discharge valves and/or get stuck and clog up the discharge valve. In at least one example, a resistance force (not displayed) can urge the discharge valve 301 towards a close configuration. The resistance force, in some examples, can include a spring. Ultimately, the premature erosion of the discharge valve 301 can reduce the lifespan of the pump 300. Accordingly, the presently disclosed pump 300 is configured such that the discharge valve 301 always opens to the maximum opening distance 309 so that the fluid and/or proppant does not damage and/or clog the discharge valve 301.

In some examples, the second chamber 333 can be defined as a region between the inner portion of the cap 303 exposable to fluids and the portion of the discharge valve 301 facing the cap 303. Within the second chamber 333 can include an outlet 334 which fluids can then be pumped through into, but not limited to, a well 101 or a wellbore 211.

In at least one example, the discharge valve 301 can include a second stem 302 protruding from the discharge valve 301. In some examples, the second stem 302 can protrude from the discharge valve 301 in the opposing direction of the first stem 307. In at least one example, the second stem 302 is operable to extend from the discharge valve through the first chamber 332 and into the plunger annulus 325.

The pump 300 can include a suction valve 310. The suction valve 310 can be operable to couple the discharge valve 301 via the second stem 302. In some examples, the second stem 302 is at a minimum length 306 to permit the suction valve to couple to the second stem 302. In at least one example, as illustrated in FIGS. 3 and 4, the suction valve 310 can include a seal and packing set 312 operable to receive the second stem 302. In at least one example, the suction valve 310 can be frictionally coupled to the second stem 302 via the seal and packing set 312. The seal and packing set 312, in some examples, can be integrated or coupled with the suction valve 310. By being either integrated or coupled to the suction valve 310, the seal and packing sets 312 allow the suction valve 310 to be position on the second stem 302 while at the same time serving as a seal to prevent fluids from flowing in between the second stem 302 and the seal and packing set 312. The suction valve 310 by being frictionally coupled to the second stem 302 allows the suction valve 310 to translate along the second stem 302 while preserving a seal. As the suction valve 310 is frictionally coupled to the second stem 302, as the suction valve 310 moves (e.g., along the longitudinal axis X-X), the friction force against the second stem 302 causes the second stem 302 and subsequently the discharge valve 301 to move in conjunction with the suction valve 310.

The suction valve 310, in some examples, can be configured to be directly frictionally or non-frictionally coupled to the second stem 302 while being sealed from preventing fluids from flowing in between the second stem 302 and suction valve 310. In some examples, the suction valve 310 can be integrated with the second stem 302. The suction valve 310, in some examples, can longitudinally translate on the second stem 302.

The suction valve 310 can include one or more latching components 311 which are coupled to the suction valve 310. In some examples, the suction valve 310 can include an internal slot 603 (see FIG. 7) or any other configurations operable to receive and lock the latching component 311 to the suction valve 310. The latching components 311 can include at least one key 600 (see FIG. 7) which expands radially outward and abuts a side surface 322 of the plunger 320. The key 600, in some examples, can be coupled to the internal slot 603 of the suction valve 310. In at least one example, a portion of the key 600 is operable to receive the second stem 302 and be positioned tangentially on top of the second stem 302. The latching component 311, in at least one example, can include more than one key 600.

The key 600, by being radially positioned on top and around the stem, assist in coupling the suction valve 310 to the plunger 320. Further, the configuration of the key 600 additionally helps preserve the orientation and angle of both the discharge valve 301 and suction valve 310 to maintain a centered position or prevent both the discharge valve 301 and the suction valve 310 from loading on one side which can cause the pump 300 to fail. By maintaining a centered position within the pump 300, the suction valve 310 will be prevented from loading on one side which can cause the pump 300 to fail. By maintaining the positioning of the suction valve 310 as in FIG. 3, the suction valve 310 can wear down evenly, extending the life of the suction valve 310. The suction valve 310 would then need to be replaced less often, saving on time, effort, and cost.

A catch portion 304 operable to receive one or more latching components 311 can be disposed in the plunger 320. In at least one example, the catch portion 304 is disposed within the plunger annulus 325. In some examples, the catch portion 304 can be a portion of the plunger annulus 325. In some examples, the catch portion 304 can be a portion of the plunger 320 outside of the plunger annulus 325. In at least one example, the catch portion 304 can include a catch surface 328. The catch surface 328 can be operable to receive and abut against the one or more latching components 311, for example as the plunger 320 translates along the longitudinal axis X-X in the second direction 327 (see FIG. 4). In some examples, as illustrated in FIG. 3, the catch surface 328 can include a vertical surface at an angle to the longitudinal axis X-X. For example, the catch surface 328 can be substantially perpendicular to the longitudinal axis X-X. In at least one example, the catch surface 328 can be located within the plunger annulus 325. In some examples, the catch surface 328 can be located on the exterior of the plunger 325. The catch surface 328, in some examples, can be operable to receive and/or abut a latching component 311. This can restrict or limit the horizontal movement of the latching component 311.

In at least one example, the catch portion 304 can include one or more side surfaces 322. The side surface 322, in some examples, can be the internal surface of the plunger annulus 325. In some examples, the side surface 322 can be a radial surface of the interior of the plunger annulus 325. In at least one example, the latching component 311 can abut radially against the side surface 322.

Figure 6:
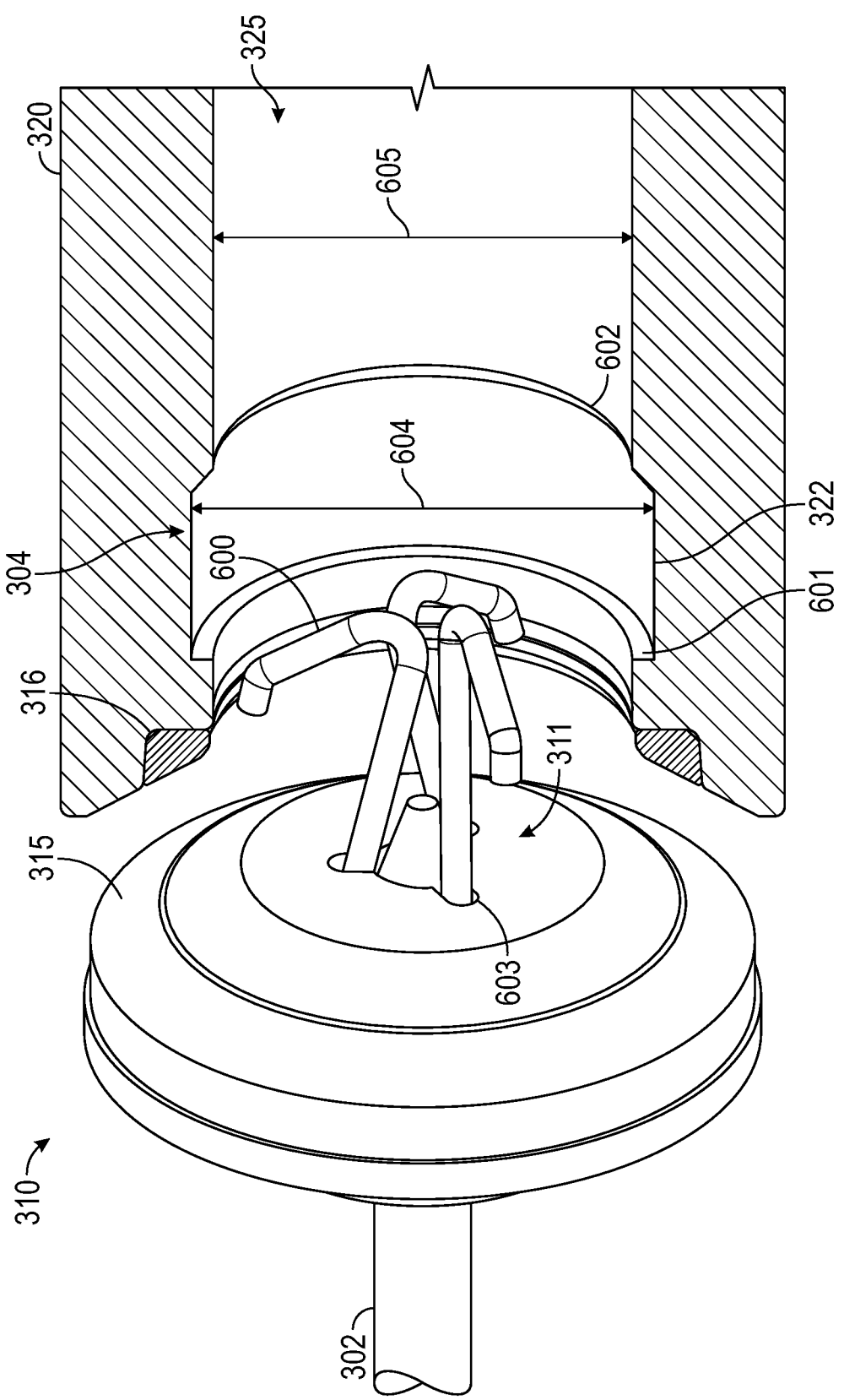
FIG. 6 illustrates a suction valve with a latching component in an uninstalled configuration.

In some examples, the catch portion 304 can be a portion of the plunger annulus 325 and have a width 604 greater than the width 605 of the remaining plunger annulus 325 that spans for a portion along the longitudinal axis X-X of the plunger 320 (see FIG. 6). In some examples, the side surface 322 can be defined as an internal cylindrical surface. In some examples, the catch surface 328 can be substantially perpendicular to the side surface 322. The catch surface 328, in some examples, can be located on the ends of the internal cylindrical surface of the catch portion 304.

FIGS. 3 and 4 illustrate the plunger 325 translating in a first direction. At least in one example, when the plunger 325 translates in the first direction 326, the discharge valve 301 transitions to an open configuration. At least in one example, when the plunger 325 translates in the first direction 326, the plunger 325 abuts against the suction valve 323 such that the suction valve 310 also translates in the first direction 326 with the plunger 325. The suction valve 310 transitions to a closed configuration to prevent fluid from flowing between the first chamber 332 and the plunger annulus 325.

In at least one example, when the plunger 320 translates in the first direction as the discharge stroke, the plunger 320 translate away from the power end 321 until the plunger 320 abuts the suction valve 310. When the plunger 320 abuts the suction valve 310, in some examples, the suction valve 310 can be in a close configuration. The suction valve 310 can include a suction valve contact 315. The suction valve contact 315, in some examples, can include a region of surface area that can be operable to come into contact or abuts a plunger bias contact 316 so that the suction valve 310 is in the closed configuration. The plunger bias contact 314, in some examples can be a region of surface area on the plunger 320 that can be operable to come into contact or abuts the plunger bias contact 313. In response, the suction valve 310 can be in the close configuration where fluids are not be able to flow outside the plunger annulus 325. The latching component 311, in some examples, can be disengaged from the catch surface 328 during the discharge stroke as the latching component 311 translates away for the catch surface 328. In at least one example, the suction valve contact 315 can be shaped to be flush with the plunger bias contact 316 when the suction valve 310 abuts the plunger 320; the suction valve contact can be shaped to have an angled surface of contract with the plunger bias contact 316 to maximum the flow of fluids and duration of the pump 300.

As the plunger 320 translates in the first direction, the plunger 320 abuts the suction valve 310 which translates the discharge valve 301 in the first direction via the friction of the seal and packing set 312 of the suction valve 310 pushing the second stem 302 in the discharge stroke direction. The discharge valve 301 can then be translated towards the cap 303 until the discharge valve 301 abuts the receptor 308 of the cap 303. The discharge valve 301 then transitions to an open configuration such that fluid and/or proppant can flow across the discharge valve 301. Thus, as the plunger 320 and the suction valve 323 translate in the first direction, the discharge valve 301 transitions to the open configuration. Once the discharge valve 301 abuts the cap 303, the discharge valve can be at its maximum opening distance 309 allowing fluids to flow unimpeded into the 333 second chamber from the first chamber 332.

The flow of fluid can initiate in the plunger annulus 325. As plunger 320 transition in the first direction 326, the flow of fluid can be propelled out the suction valve 310. As the plunger 320 continues to translate in the first direction 326, the suction valve 310 can transition into a close configuration while discharge valve 301 can transition into an open configuration simultaneously or subsequently. The flow of flow can continue to be expelled from the first chamber 332 through the second chamber 333 as the discharge valve is in an open configuration allowing fluids to flow into the second chamber 333. The fluid can then be pumped outside the pump through the outlet 334.

In at least one example, as illustrated in FIG. 5, when the plunger 320 transitions into the suction stroke (e.g., second direction 327), the latching component 311 in response can translate in the second direction 327 until the key 600 abuts the catch surface 328. As the plunger 320 continues to pull the latching component 311 in the second direction 327, the suction valve 310 also moves in the second direction 327. As the suction valve 310 moves in the second direction 327 and is coupled with the second stem 302, the second stem 302 also translates in the second direction 327. The suction valve 310 can also simultaneously be in an open configuration to allow fluids to flow from within the plunger annulus 325 to a first chamber 332. Because the fluids can include proppants, the proppants would strike and abrase the suction valve 310 in an effort to open it. Thus, this configuration eliminates premature wear and tear of the suction valve 310 which can lead to a shorter pump life.

During the suction stroke, the discharge valve 301 can be transitioned into the close configuration such that fluid cannot flow across the discharge valve 301. As the plunger 320 translates in the second direction 327 during the suction stroke, the latching component 311 abuts the catch surface 328. As a result of abutting the catch surface 328, the seal and packing set 312 pulls via friction the second stem 302 which in turn translates the discharge valve 301 towards the power end 320. The plunger 320 translating in the suction stroke causes the discharge valve 301 to abut the discharge bias 305. In some examples, when the discharge valve 301 abuts the discharge valve bias 305, the discharge valve 301 is in a close configuration. Proppants and fluids cannot be able to flow through the discharge valve 301 in the close configuration.

In at least one example, the discharge valve 301 can abut the discharge bias 305 as the plunger 320 pulls the latching component 311 that pulls the suction valve 310 that pulls the second stem 305, which is an extension of the discharge valve 301. The discharge valve 301 can then be in a close configuration, preventing flow of fluid into the second chamber 334. At this juncture, fluid is prevented from flowing from the first chamber 332 across the discharge valve 301 into the second chamber 333.

A configuration of the disclosure herein, in some examples, can include the discharge valve 301, the suction valve 310, and the plunger 320 sharing a same axis, here being the second stem 302. The discharge valve 301, the suction valve 310, and the plunger 320 can be coupled to one another directly and/or indirectly. In some examples, the second stem can facilitate the coupling of the discharge valve 301, the suction valve 310, and the plunger 320. The discharge valve 301 can have an inverse relationship with the suction valve 310 where when the suction valve 310 opens, the discharge valve 301 closes and where when the suction valve 310 closes, the discharge valves 301 opens. The second stem 302 and the discharge valve 301 can have a linear relationship with the plunger 320 where when the plunger 320 translate in the first direction 326, the second stem 302 and discharge valve 301 translate in the first direction as well 326. This relationship is the same for the second direction 327. The opening and closing of both valves can be done simultaneously and driven by the plunger 320 directly.

FIG. 6 illustrates a suction valve 310 with a latching component 311 in an uninstalled configuration. The latching component 311 is operable to translate the displacement of the plunger 320 in the second direction 327 to the discharge valve 301 and the suction valve 310. In at least one example, when the plunger 320 translates in the second direction, the latching component 311 can be received by the catch surface 328 and translate along with the plunger 320. As the latching component 311 is coupled with the suction valve 310, the latching component 311 causes the suction valve 310 to translate in the second direction and transition to the open configuration. As the suction valve 310 translates in the second direction, the suction valve 310 causes the discharge valve 301 to translate in the second direction and transition to a close configuration. In some examples, the length of the latching component 311 correlates with the maximum opening distance 317 of the suction valve 310. In at least one example, the latching component 311 can prevent the suction valve 310 and the discharge valve (indirectly) from decoupling from the plunger 320, since the latching component 311 is received in the catch portion 304. The latching component 311 can be configured to couple the plunger 320 to the suction valve 310. In at least one example, the latching component 311 can be configured to receive and couple the second stem 302 to the plunger 320.

The latching components 311 can include at least one key 600 which is operable to extend radially outward and abut the side surface 322 of the plunger 320 when in the installed configuration. As the plunger 320 translates translate along the longitudinal axis X-X in the second direction, the keys 600 remain in the same position within the catch portion 304 until the keys 600 abut the catch surface 328 via a key catch 700. When the keys 600 are received by the catch surface 328, as the plunger 320 continues translating in the second direction, the keys 600, and subsequently the suction valve 310, are pulled along with the plunger 320 in the second direction. The keys 600 can be configured to abut against the catch surface 328 so that when the plunger 320 translates in the second direction 327, the suction valve 310 can transition into the open configuration. The keys 600 can be configured to abut against the catch surface 328 so that when the plunger 320 translates in the second direction 327, the discharge valve 301 can translate into the close configuration. In at least one example, the key 600 can be more than one key.

The key 600 can be shaped in a configuration such that when the second stem 302 is not inserted in the suction valve 310 and the internal slot 603, the key 600 can constrict towards a central axis. When the keys 600 constrict towards the central axis, the keys 600 are not received by the catch surface 328 and can be retrieved out of the plunger annulus 325. By removing the key 600 out of the catch portion 304, the second stem 302 can be decoupled from the plunger 320. Accordingly, the suction valve 310 and the discharge valve 301 can be easily removed from the pump 300 to be replaced and/or serviced. Because the keys 600 are operable to constrict when the second stem 302 is removed, this configuration provides the benefits of ease in the uninstallation of keys 600 to the suction valve 310.

In at least one example, the key 600 can include more than one key such that when the keys 600 constrict, the keys 600 can be able to be inserted into the plunger annulus 325 and into the catch portion 304. Because the keys 600 are operable to constrict before the second stem 302 is inserted therethrough, this configuration provides the benefits of ease in the installation of keys 600 into the suction valve 310.

Figure 7:
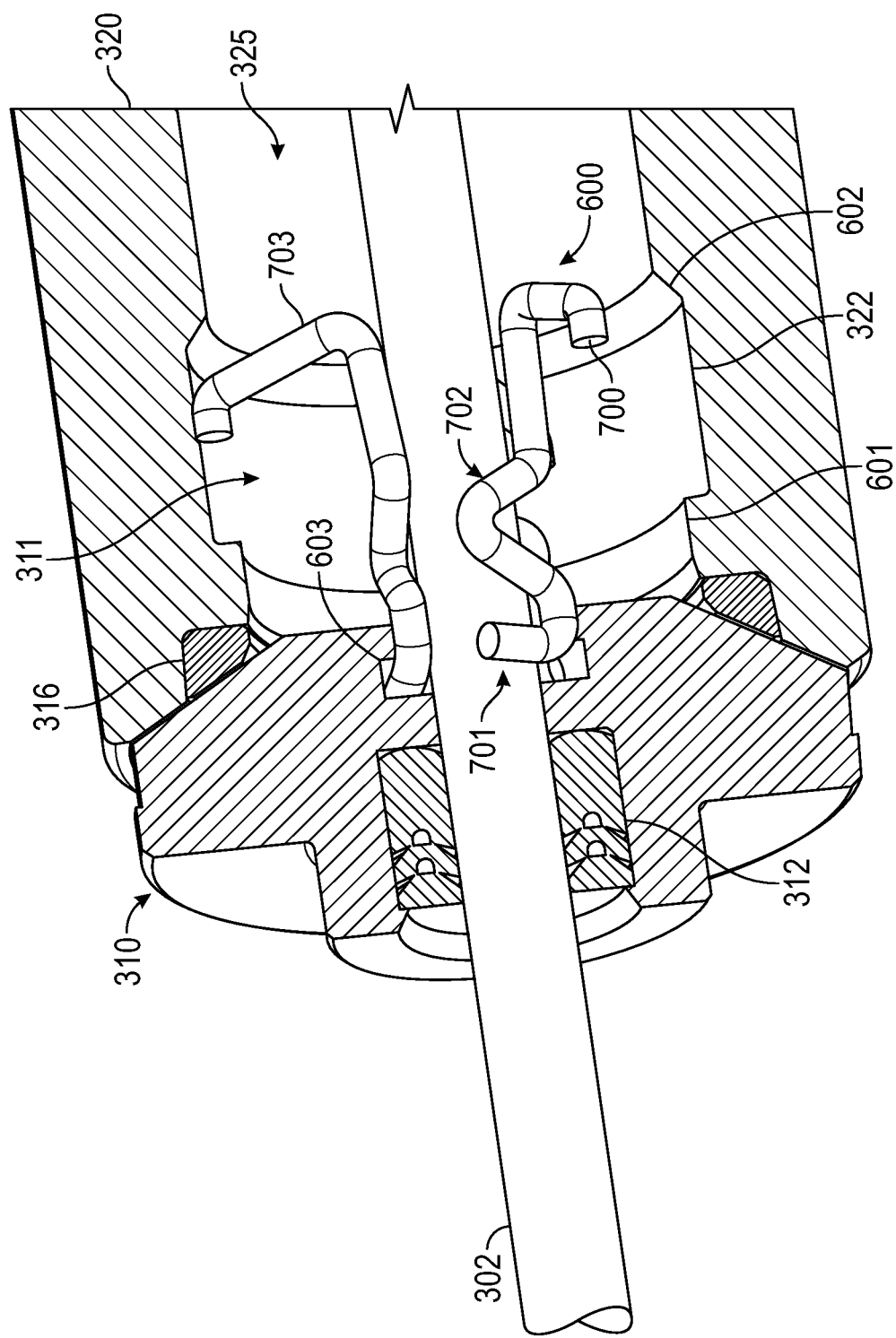
FIG. 7 illustrates a suction valve with a latching component in an installed configuration.

FIG. 7 illustrates a suction valve with a latching component 311 in an installed configuration. The latching component 311 includes keys 600 operable to couple with the suction valve 310. The key 600, in some examples, can be received in an internal slot 603 formed in the suction valve 310. The internal slot 603, in some examples, can be a recess within the suction valve 310 that is large enough to contain at least a portion of one key 600. The internal slot 603, in some examples, can be configured to receive a portion of the key 600 and lock the key 600 in the internal slot 603 when the second stem 302 is inserted (see FIG. 6). The key 600, in some examples, can be shaped to allow the flow of fluid around the key 600 and not halt the flow of the fluid.

In at least one example, a portion of the key 600 can be configured to receive the second stem 302 and be positioned tangentially on top of the second stem 302. The key 600, in one example, can include a hook 701. In at least one example, the key 600 can be configured to rotate when the second stem 302 is inserted through the seal and packing set 312 and through the internal slot 603. In at least one example, as the key 600 rotates when the second stem 302 is inserted, the hook 701 of the key 600 rotates and abuts the inner surfaces of the internal slot 603. This configuration can lock the key 600 into the internal slot 603 when the second stem 302 remains inserted. In at least one example, as the key 600 rotates when the second stem 302 is inserted, a portion of the key 703 is configured to extend outward towards the side surface 322. The key 600, in some examples, can include a key catch 700 operable to abut the catch surface 328 or the first groove 601.

In at least one example, as the key 600 rotates when the second stem 302 is inserted, a portion of the key 702 can be configured to be positioned tangentially on top of the second stem 302. The key 600, by being radially positioned on top and around the stem, assist in coupling the suction valve 310 to the plunger 320. Further, the configuration of the key 600 additionally helps preserve the orientation and angle of both the discharge valve 301 and suction valve 310 to maintain a centered position or prevent both the discharge valve 301 and the suction valve 310 from loading on one side which can cause the pump 300 to fail. By maintaining a centered position within the pump 300, the suction valve 310 will be prevented from loading on one side which can cause the pump 300 to fail. By maintaining the positioning of the suction valve 310 as in FIG. 3, the suction valve 310 can wear down evenly, extending the life of the suction valve 310. The suction valve 310 would then need to be replaced less often, saving on time, effort, and cost.

Other configurations of a latching component can include a key 600 configured to rotate when the second stem 302 is inserted. As the key 600 rotates, the key 600 can be locked into the suction valve 310 and the key 600 can couple to the second stem 302. The key 600 can be a singular unit and/or integrated with the suction valve 310 and/or the plunger 320.

Figure 8:
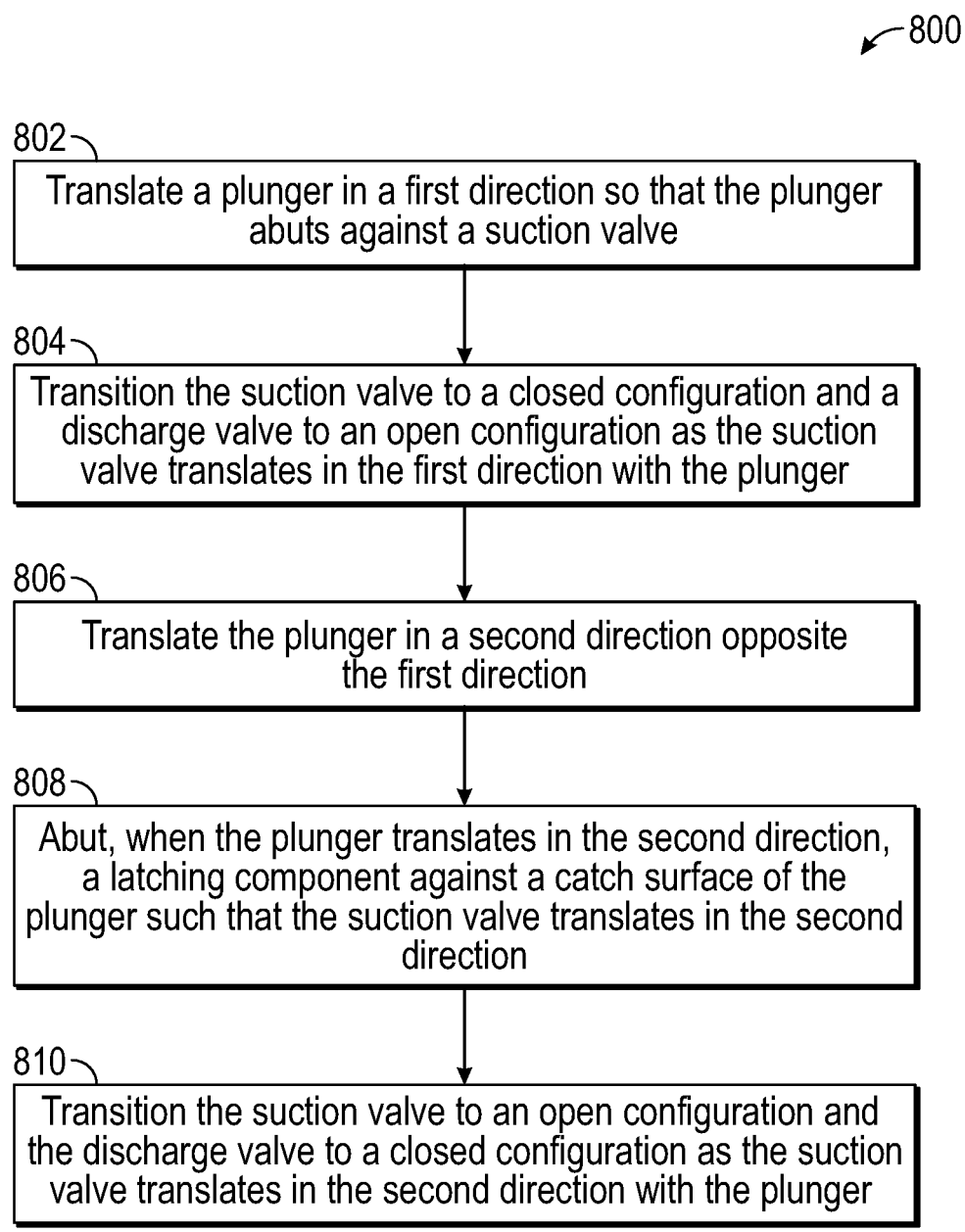
FIG. 8 is a flow chart of a method for pumping.

Referring to FIG. 8, a flowchart is presented in accordance with an example embodiment. The method 800 is provided by way of example, as there are a variety of ways to carry out the method. The method 800 described below can be carried out using the configurations illustrated in FIGS. 1-7, for example, and various elements of these figures are referenced in explaining example method 800. Each block shown in FIG. 8 represents one or more processes, methods or subroutines, carried out in the example method 800. Furthermore, the illustrated order of blocks is illustrative only and the order of the blocks can change according to the present disclosure. Additional blocks may be added or fewer blocks may be utilized, without departing from this disclosure. The example method 800 can begin at block 802.

At block 802, a plunger is translated in a first direction so that the plunger abuts against a suction valve. In some examples, the plunger can be driven by a power end. The power end can include a motor or any other suitable power source without deviating from the scope of the disclosure, so long as the power end is operable to cause the plunger to translate. In some examples the plunger can be disposed in a pump.

At block 804, the suction valve is transitioned to a closed configuration and a discharge valve is transitioned to an open configuration as the suction valve translates in the first direction with the plunger. In at least one example, fluids and/or proppants cannot flow through the suction valve but can flow through the discharge valve.

At block 806, the plunger is translated in a second direction opposite of the first direction. At block 808, a latching component abuts against a catch surface of the plunger such that the suction valve translates in the second direction when the plunger translates in the second direction.

At block 810, the suction valve is transitioned to an open configuration and the discharge valve is transitioned to a closed configuration as the suction valve translates in the second direction with the plunger. In at least one example, fluids and/or proppants can flow through the suction valve but not through the discharge valve and out the pump.

Numerous examples are provided herein to enhance understanding of the present disclosure. A specific set of statements are provided as follows.

Statement 1: A plunger actuated valve is disclosed comprising: a discharge valve; a stem extending from the discharge valve; and a suction valve coupled with the stem, the suction valve operable to abut against a plunger as the plunger translates in a first direction such that the suction valve is in a closed configuration, the suction valve including a latching component operable to abut against a catch surface of the plunger when the plunger translates in a second direction opposite the first direction such that the suction valve translates in the second direction.

Statement 2: A plunger actuated valve is disclosed according to Statement 1, wherein the suction valve is frictionally coupled with the stem.

Statement 3: A plunger actuated valve is disclosed according to Statement 2, wherein when the suction valve abuts against the plunger, the reaction valve translates in the first direction.

Statement 4: A plunger actuated valve is disclosed according to Statement 3, wherein when the suction valve translates in the first direction, the suction valve causes the stem and the discharge valve to translate in the first direction such that the discharge valve is in an open configuration.

Statement 5: A plunger actuated valve is disclosed according to any of preceding Statements 2-4, wherein the suction valve includes a seal and packing set is operable to frictionally couple the suction valve with the stem.

Statement 6: A plunger actuated valve is disclosed according to any of preceding Statements 1-5, wherein when the suction valve translates in the first direction, the suction valve is in an open configuration.

Statement 7: A plunger actuated valve is disclosed according to Statement 6, wherein when the suction valve translates in the second direction, the suction valve causes the stem and the discharge valve to translate in the second direction until the discharge valve is in a closed configuration.

Statement 8: A plunger actuated valve is disclosed in any of preceding Statements 1-7, wherein the latching component is operable to extend radially to abut against side surfaces of the plunger so that the suction valve maintains a centered position.

Statement 9: A plunger actuated valve is disclosed according to any of preceding Statement 1-9, wherein the latching component includes at least one key coupled with the suction valve.

Statement 10: A system is disclosed comprising: a plunger operable to translate in a first direction and a second direction opposite the first direction; and a plunger actuated valve apparatus including: a discharge valve; a stem extending from the discharge valve; a suction valve coupled with the stem, the suction valve operable to abut against a plunger as the plunger translates in the first direction such that the suction valve is in a closed configuration, the suction valve including a latching component operable to abut against a catch surface of the plunger when the plunger translates in the second direction such that the suction valve translates in the second direction.

Statement 11: The system is disclosed according to Statement 10, wherein the suction valve is frictionally coupled with the stem.

Statement 12: The system is disclosed according to Statement 11, wherein when the suction valve abuts against the plunger, the suction valve translates in the first direction.

Statement 13: The system is disclosed according to Statement 12, wherein when the suction valve translates in the first direction, the suction valve causes the stem and the discharge valve to translate in the first direction such that the discharge valve is in an open configuration.

Statement 14: The system is disclosed according to any of preceding Statements 11-13, wherein the suction valve includes a seal and packing set is operable to frictionally couple the suction valve with the stem.

Statement 15: The system is disclosed according to any of preceding Statements 10-14, wherein when the suction valve translates in the second direction, the suction valve is in an open configuration.

Statement 16: The system is disclosed according Statement 15, wherein when the suction valve translates in the second direction, the suction valve causes the stem and the discharge valve to translate in the second direction until the discharge valve is in a closed configuration.

Statement 17: The system is disclosed according to any of preceding Statements 10-16, wherein the plunger includes a receiving chamber operable to receive the latching component, wherein the receiving chamber includes side surfaces and the catch surface.

Statement 18: The system is disclosed according to Statement 17, wherein the latching component is operable to extend radially to abut against the side surfaces of the plunger so that the suction valve maintains a centered position.

Statement 19: The system is disclosed according to any of preceding Statements 10-17, wherein the latching component includes at least one key coupled with the suction valve.

Statement 20: A method for a plunger actuated valve is disclosed comprising: translating a plunger in a first direction so that the plunger abuts against a suction vale; transitioning the suction valve to a closed configuration and a discharge vale to an open configuration as the suction valve translates in the first direction with the plunger; translating the plunger in a second direction opposite the first direction; abutting, when the plunger translates in the second direction, a latching component against a catch surface of the plunger such that the suction valve translates in the second direction; and transitioning the suction valve to an open configuration and the discharge valve to a closed configuration as the suction valve translates in the second direction with the plunger.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A plunger actuated valve comprising:
a discharge valve;
a stem extending from the discharge valve; and
a suction valve coupled with the stem, the suction valve operable to abut against a plunger as the plunger translates in a first direction such that the suction valve is in a closed configuration,
the suction valve including a latching component operable to abut against a catch surface of the plunger when the plunger translates in a second direction opposite the first direction such that the suction valve translates in the second direction.

2. The plunger actuated valve of claim 1, wherein the suction valve is frictionally coupled with the stem.

3. The plunger actuated valve of claim 2, wherein when the suction valve abuts against the plunger, the suction valve translates in the first direction.

4. The plunger actuated valve of claim 3, wherein when the suction valve translates in the first direction, the suction valve causes the stem and the discharge valve to translate in the first direction such that the discharge valve is in an open configuration.

5. The plunger actuated valve of claim 2, wherein the suction valve includes a seal and packing set which is operable to frictionally couple the suction valve with the stem.

6. The plunger actuated valve of claim 1, wherein when the suction valve translates in the second direction, the suction valve is in an open configuration.

7. The plunger actuated valve of claim 6, wherein when the suction valve translates in the second direction, the suction valve causes the stem and the discharge valve to translate in the second direction until the discharge valve is in a closed configuration.

8. The plunger actuated valve of claim 1, wherein the latching component is operable to extend radially to abut against side surfaces of the plunger so that the suction valve maintains a centered position.

9. The plunger actuated valve of claim 1, wherein the latching component includes at least one key coupled with the suction valve.

10. A system comprising:
a plunger operable to translate in a first direction and a second direction opposite the first direction; and
a plunger actuated valve apparatus including:
a discharge valve;
a stem extending from the discharge valve;
a suction valve coupled with the stem, the suction valve operable to abut against a plunger as the plunger translates in the first direction such that the suction valve is in a closed configuration,
the suction valve including a latching component operable to abut against a catch surface of the plunger when the plunger translates in the second direction such that the suction valve translates in the second direction.

11. The system of claim 10, wherein the suction valve is frictionally coupled with the stem.

12. The system of claim 11, wherein when the suction valve abuts against the plunger, the suction valve translates in the first direction.

13. The system of claim 12, wherein when the suction valve translates in the first direction, the suction valve causes the stem and the discharge valve to translate in the first direction such that the discharge valve is in an open configuration.

14. The system of claim 11, wherein the suction valve includes a seal and packing set which is operable to frictionally couple the suction valve with the stem.

15. The system of claim 10, wherein when the suction valve translates in the second direction, the suction valve is in an open configuration.

16. The system of claim 15, wherein when the suction valve translates in the second direction, the suction valve causes the stem and the discharge valve to translate in the second direction until the discharge valve is in a closed configuration.

17. The system of claim 10, wherein the plunger includes a receiving chamber operable to receive the latching component, wherein the receiving chamber includes side surfaces and the catch surface.

18. The system of claim 17, wherein the latching component is operable to extend radially to abut against the side surfaces of the plunger so that the suction valve maintains a centered position.

19. The system of claim 10, wherein the latching component includes at least one key coupled with the suction valve.

20. A method for a plunger actuated valve comprising:
translating a plunger in a first direction so that the plunger abuts against a suction valve;
transitioning the suction valve to a closed configuration and a discharge valve to an open configuration as the suction valve translates in the first direction with the plunger;
translating the plunger in a second direction opposite the first direction;
abutting, when the plunger translates in the second direction, a latching component against a catch surface of the plunger such that the suction valve translates in the second direction; and
transitioning the suction valve to an open configuration and the discharge valve to a closed configuration as the suction valve translates in the second direction with the plunger.

* * * * *